UNITED STATES PATENT OFFICE.

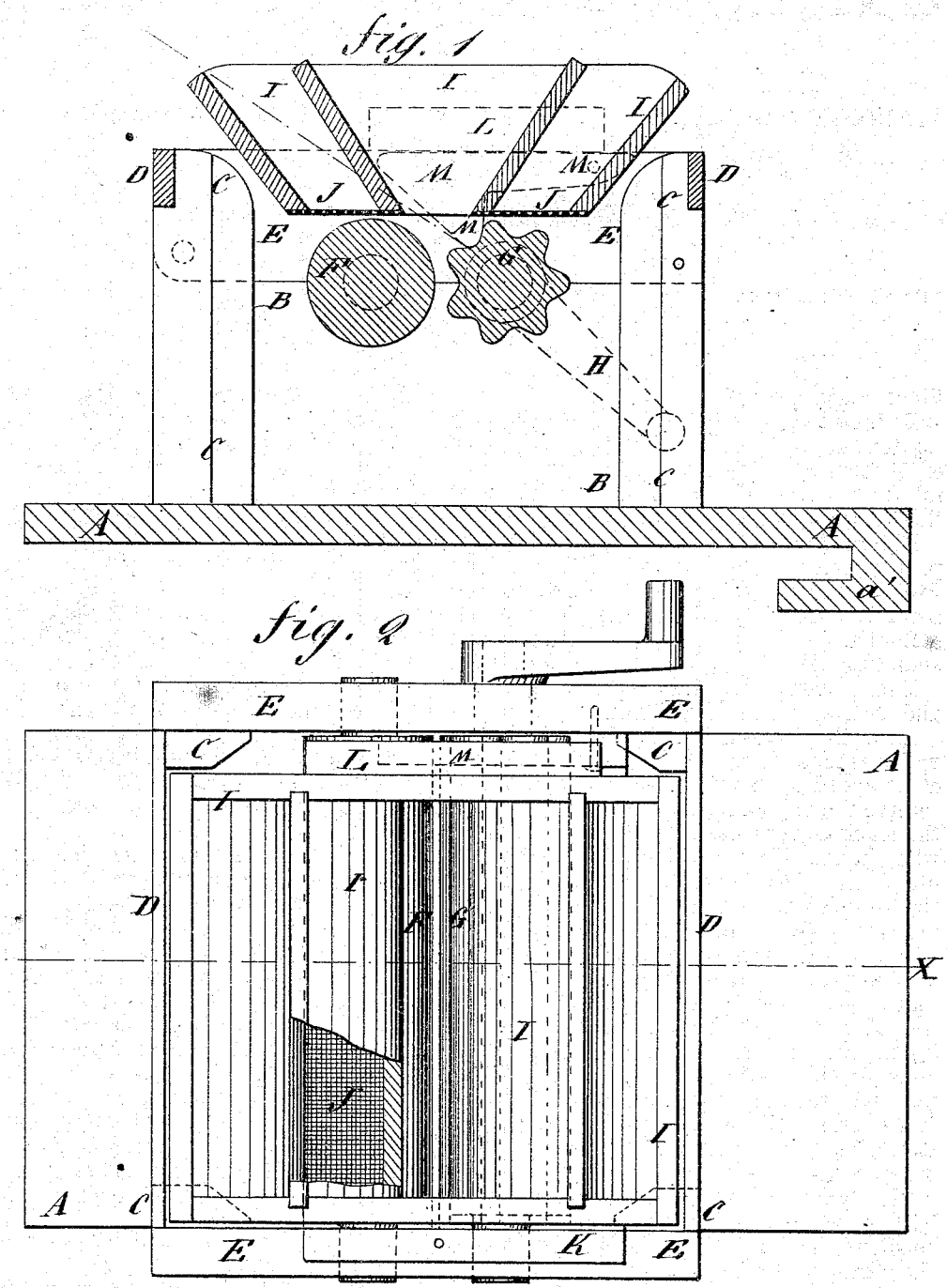

AARON P. FORMAN, OF CANTON, MISSISSIPPI, ASSIGNOR TO WILLIAM B. STINSON, OF SAME PLACE.

IMPROVEMENT IN BISCUIT-BOARDS.

Specification forming part of Letters Patent No. 158,266, dated December 29, 1874; application filed August 15, 1874.

*To all whom it may concern:*

Be it known that I, AARON P. FORMAN, of Canton, in the county of Madison and State of Mississippi, have invented a new and useful Improvement in Biscuit-Board, of which the following is a specification:

Figure 1 is a vertical section of my improved machine, taken through the line $x\,x$, Fig. 2. Fig. 2 is a top view of the same, part being broken away to show the construction.

Similar letters of reference indicate corresponding parts.

The invention will first be fully described, and then pointed out in the claim.

A is the bottom board of the machine, which is made long, and has a grooved cleat, $a'$, attached to the under side of one end to receive the edge of the table-top upon which the machine is placed, and thus hold it firmly when in use. To the side edges of the middle part of the bottom board A are attached the lower edges of two side boards, B, which are strengthened by posts C, the upper ends of which are connected by cross-bars D. Upon the upper edges of the side boards B are placed other side boards or bars E, which are hinged at one end by pins passing into the posts C, and are secured at their other ends to the other posts C by detachable pins. In the adjacent edges of the boards B E are formed the bearing for the journals of two rollers, F G, which are placed near each other, so as to nearly touch. The roller F is made plain, but the roller G is corrugated with large and deep longitudinal corrugations, as shown in Fig. 1. One of the journals of the corrugated roller G projects, and to it is attached the crank H, by which the machine is operated. I is the hopper, which is made with three compartments. The central compartment is designed to receive the dough.

The two side compartments are provided with wire-gauze bottoms J, and are designed to receive flour to be sprinkled upon the rollers F G to keep the dough from sticking to them. To the end of the hopper I farthest from the crank H is attached a cleat, K, which rests upon the top of the board or bar E, and is secured in place by a loosely-fitting detachable pin. To the other end of the hopper I is attached a cleat, L, which rests upon a latch, M, the outer end of which is pivoted to the board or bar E, and its inner end or head rests upon the corrugated roller G, near its end, so that, as the machine is operated to draw the dough between the rollers F G, the hopper I will be agitated to sift flour upon the rollers.

With this construction the machine can be readily taken apart for convenience in cleaning it.

In using the machine, the dough is placed in the central compartment of the hopper I, and is drawn through between the rollers by their revolution. The dough falls from the rollers. It falls upon the bottom board A, from which it is removed, and again placed in the hopper I, and the operation is continued until the dough has been sufficiently worked.

Having thus described my invention, I claim as new and desire to secure by Letters Patent—

The combination of the hopper I, having the central dough-feeding compartment and the side flour-sifting compartments, with the pivoted latch M, corrugated roller G, plain roller F, and side frames B E, substantially as shown and described, and for the purpose set forth.

AARON P. FORMAN.

Witnesses:
H. BARTELS,
LEE JONES.